Sept. 2, 1958     A. R. HACKER     2,850,420
BELT
Filed June 14, 1955
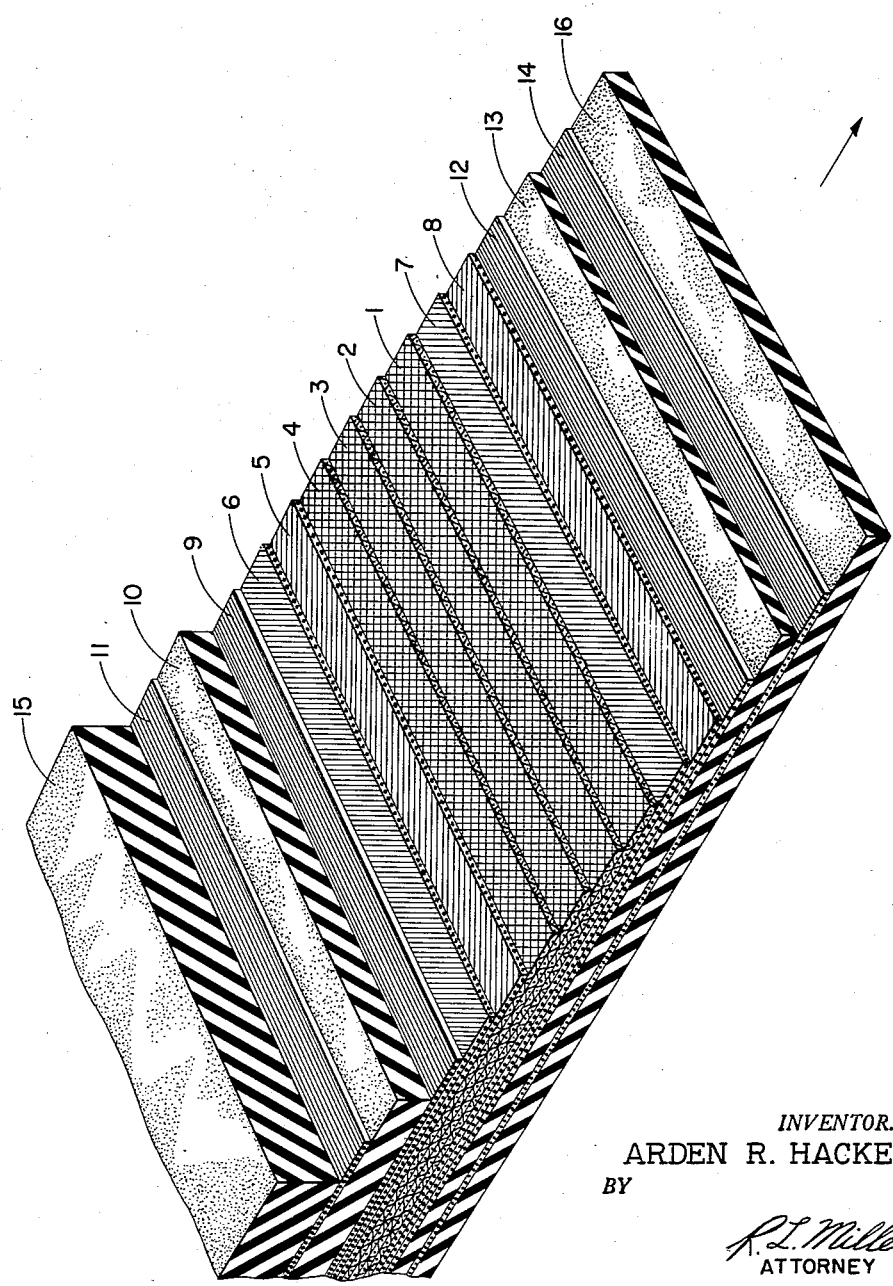
INVENTOR.
ARDEN R. HACKER
BY
*R. L. Miller*
ATTORNEY

United States Patent Office 2,850,420
Patented Sept. 2, 1958

2,850,420
BELT

Arden R. Hacker, Akron, Ohio, assignor to The Goodyear Tire & Rubber Company, Akron, Ohio, a corporation of Ohio Application June 14, 1955, Serial No. 515,389

5 Claims. (Cl. 154—52.1)

This invention relates to flat conveyor belts and more particularly to belts for applications wherein high impact resistance is desirable.

Frequently when large lumpy and coarse fragments, such as slag, rock, and the like, are conveyed by means of flat belts, the material is deposited on the belt at the loading station in a haphazard and forceful manner. In many such installations, the material is dumped from considerable height onto the moving belt causing damage to the protective cover thereof and frequently also causing rapid progressive failure of the internal reinforcement layers. While a portion of the impact force may be absorbed by providing cord breaker layers between the protective cover and the tension section, still further impact resistance often is imperative if the belt life is to be of satisfactory duration. It is to the construction of such high extraordinary impact resistance belts that this invention is directed.

The general object of the invention is to provide a belt construction having high impact resistance.

A further object of the invention is to provide high impact resistance without excessive sacrifice of flexibility and increase of thickness.

The aforesaid objects of the invention, and other objects which will become apparent as the description proceeds, are achieved by a belt construction wherein a breaker structure is incorporated, not only, if desired, on the load carrying side of the belt, but also on the pulley contacting side of the belt, thus forming a novel arrangement from which unexpected resistance to high impact loading is obtained.

Of the drawing, the figure shown is a perspective cutaway view of a portion of a belt utilizing the construction of the invention.

In the drawing, the internal section of the tension section is formed of four superposed layers 1, 2, 3, and 4 of material such as woven fabric. As shown, a layer 5 of material such as pickless cord fabric, is positioned over the layer 4 with the cords preferably at substantially a 45 degree angle to the longitudinal axis of the belt. Immediately overlying the layer 5 is a layer 6 of material similar to that of layer 5. The layer 6 is positioned so that the cords are at substantially a 90 degree angle with those of the layer 5 and at a 45 degree angle with the longitudinal belt axis.

On the other side of the inner portion of the tension section, layers 7 and 8, similar to layers 5 and 6, are positioned in a like manner to also conform in angular relationship with the layers 5 and 6. It will be appreciated that the angular orientation of the layers 5, 6, 7 and 8 may vary dependent on design considerations well known to one skilled in the art.

The layers 1 through 4 inclusive, form the internal tension portion and the layers 5 through 8 inclusive, the external or envelope portion of the tension section of the belt which is arranged symmetrically around the neutral axis of the belt.

Outwardly overlying the layer 6 is a transverse cord breaker layer 9, and next thereon is a layer 10 of resilient cushioning material, such as rubber, and another similar transverse cord breaker 11, in the order named. Likewise outwardly overlying the layer 8 are two transverse cord breaker layers 12 and 14, having a cushioning layer 13 therebetween. An outer protective covering 15, preferably of rubber or rubber-like material, overlies the breaker layer 11 and a similar cover 16 overlies the breaker layer 14. For purposes of convenience, hereafter the side of the belt having as its face the cover 15 will be designated as the load carrying side, and the side showing the cover 16 as the pulley contacting side. It will be understood that the materials used and the thickness, compounding and the like of the covers 15 and 16 are not necessarily identical but are such as best to meet the particular service conditions under which the belt is to operate. These practices are well known in the art. As also is well known in the art, the cover 15 of the load side is generally of a thicker gauge although usually of the same material as the cover 16 of the pulley side.

It will be immediately apparent that provision has been made for a breaker structure, not only on the load carrying side of the belt whereon the usual construction provides for impact absorption, but also on the pulley contacting side of the belt. The addition of an impact absorption structure on the pulley side causes an exceptional increase in the ability of the belt to absorb tremendous impact under unusual operating conditions. Generally where high impact loading conditions are to be encountered, the belt idlers are also designed to absorb at least a portion of the impact and may be such as pneumatic tires, grooved rubber rollers, rubber-covered steel rolls, and the like. It has been determined that where resilient idlers are utilized, the placement of a breaker structure on the pulley contacting side of the belt significantly increases the impact resistance of the belt.

Since the impact initially occurs on the load carrying side of the belt, it would seem logical to provide a breaker structure at a point where the initial shock could be absorbed; in other words, on the load carrying side of the belt. However, it has been discovered that such placement, while beneficial to some extent, does not achieve the desired purpose. On the contrary, it has been observed that with resilient idlers, the plies of the tension section immediately adjacent the pulley are first broken, with the result that progressive failure through the belt occurs rapidly thereafter. Placement of a breaker structure on the pulley contacting side of the belt results in an immediate and unexpected increase in belt impact resistance. It would appear that this result is attained because of the resilient nature of the belt and supporting idler. Both the belt and resilient idler deform under a concentrated impact load to produce a cup-shaped depression at the point of impact. In view of the belt thickness, and therefore the increased arc of deflection with the distance from the point of impact, the idler-side plies are under higher tensile stress than the load-carrying side plies, thus causing the former to fail before the latter.

Actual tests of conventional belts and belts embodying the construction of the invention were made and comparisons therebetween were effected utilizing belts of identical materials in identical environments with only the location of the breaker structure varied. The results of such tests revealed that an increase in impact resistance of as much as approximately 25% was attained with a breaker structure on the pulley contacting side of the belt over that with the breaker placed in normal manner in the load carrying side of the belt.

As an example, one embodiment of the invention in a belt formed as shown in the figure utilized the following materials:

Plies 1 through 4 inclusive—Cotton warp with nylon fill.
Plies 5 through 8 inclusive—Bias cut nylon cord envelope.
Plies 9, 11, 12 and 14—Transverse nylon cord breaker.
Plies 10 and 13—Cushion rubber.
Covers 15 and 16—Cover rubber.

It will now be apparent that the objects of the invention have been achieved by the construction herebefore described in detail, obtaining a belt having high impact resistance without excessive faults flowing therefrom with regard to flexibility, increased thickness, and the like.

While certain representative embodiments and details have been shown for the purpose of illustrating the invention, it will be apparent to those skilled in this art that various changes and modifications may be made therein without departing from the spirit or scope of the invention.

I claim:

1. An impact resistant conveyor belt having a load carrying side and an opposing pulley contacting side, comprising a tension section having a plurality of layers of woven fabric and a plurality of protective layers distributed on each side of and outwardly overlying the fabric layers, each said protective layer formed of a continuous layer of cords laid on a bias of substantially 45 degrees to the longitudinal axis of the belt with adjacent layers laid on a bias substantially 90 degrees alternately with respect to each other, a first breaker structure having at least one layer of material formed of parallel cords extending substantially transversely of the belt and positioned in superposed relation to the pulley side of the tension section, a first protective covering over the breaker structure, and a second protective covering over the load side of the tension section.

2. A belt as defined in claim 1 in which a second breaker structure similar to the first breaker structure is positioned in superposed relation to the load carrying side of the tension section.

3. An impact-resistant conveyor belt having a load-carrying side and an opposing pulley-contacting side, comprising a tension section having a plurality of layers of woven fabric and a plurality of fabric-reinforced protective layers adjacent to and outwardly of the fabric layers, each said protective layer formed of a continuous layer of cords laid on a bias at a substantial angle to the longitudinal axis of the belt with adjacent layers laid on a bias at a similar angle to the longitudinal axis but in opposite directions, a breaker structure on the load-carrying side of the belt, a second breaker structure having at least one continuous layer of impact-absorbing textile parallel cords extending substantially transversely of the belt positioned in super-posed relation to the pulley side of the tension section, a first protective covering of rubber-like resilient material over the second breaker structure forming the pulley side belt cover, and a second protective covering over the load side of the tension section forming the load-carrying side belt cover.

4. An impact-resistant conveyor belt having a load-carrying side and an opposing pulley-contacting side, comprising a tension section having a plurality of layers of woven fabric and a plurality of protective layers distributed on each side and outwardly overlying the fabric layers, each said protective layer formed of a continuous layer of cords laid on a bias at a substantial angle to the longitudinal axis of the belt with adjacent layers laid on a bias at a similar angle to the longitudinal axis but in opposite directions thereto, a first and second breaker layer structure, each having at least one layer of impact-absorbing textile parallel cords extending substantially transversely of the belt and each positioned in super-posed relation to the load and pulley sides of the tension section respectively, and a first and second protective rubber-like resilient cover over the first and second breaker structures respectively forming the load-carrying and pulley covers of the belt.

5. An impact-resistant conveyor belt having a load-carrying side and an opposing pulley-contacting side, comprising a tension section having a plurality of layers of woven fabric and a plurality of protective layers distributed on each side of and outwardly overlying the fabric layers, each said protective layer formed of a continuous layer of cords laid on a bias at a substantial angle to the longitudinal axis of the belt with adjacent layers laid on a bias at a similar angle to the longitudinal axis but in opposite directions thereto, a first breaker of impact-absorbing textile material positioned in super-posed relation to the load side of the tension section, a similar breaker positioned on the pulley side of said tension section, a layer of resilient rubber cushioning material overlying each of said breakers, a second breaker layer outwardly overlying each of the first mentioned breaker layers, the first and second breaker layers of the load and pulley sides respectively of said belt being formed of parallel cords extending substantially transversely of the belt and a protective covering over each of said second breaker layers to form the load and pulley covers respectively of the belt, all of the elements of said belt being vulcanized into an integral structure.

References Cited in the file of this patent

UNITED STATES PATENTS

| | | |
|---|---|---|
| 2,113,561 | Freedlander | Apr. 12, 1938 |
| 2,141,796 | Loges | Dec. 27, 1938 |
| 2,211,607 | Reimel | Aug. 13, 1940 |
| 2,237,173 | Brill | Apr. 1, 1941 |
| 2,310,819 | Van Orden | Feb. 9, 1943 |

FOREIGN PATENTS

| | | |
|---|---|---|
| 496,634 | Canada | Oct. 6, 1953 |